I. GREGG.
MODE OF DRYING BRICKS.

No. 66,486. Patented July 9, 1867.

Witnesses:

Inventor.

United States Patent Office.

ISAAC GREGG, OF PHILADELPHIA, PENNSYLVANIA.

Letters Patent No. 66,486, dated July 9, 1867.

---

IMPROVED MODE OF DRYING BRICKS.

---

*The Schedule referred to in these Letters Patent and making part of the same.*

---

TO ALL WHOM IT MAY CONCERN:

Be it known that I, ISAAC GREGG, of Philadelphia, Pennsylvania, have invented an Improved Apparatus for Drying Bricks, etc.; and I do hereby declare the following to be a full, clear, and exact description of the same, reference being had to the accompanying drawing, and to the letters of reference marked thereon.

My invention consists of an apparatus constructed as fully described hereafter, whereby bricks or other articles of clay may be economically dried to any required extent and without the necessity of handling them after they are removed from the mould and while in a plastic state.

In order to enable others skilled in the art to make and use my invention, I will now proceed to describe its construction and operation, reference being had to the accompanying drawing, which forms a part of this specification, and in which—

Figure 1:
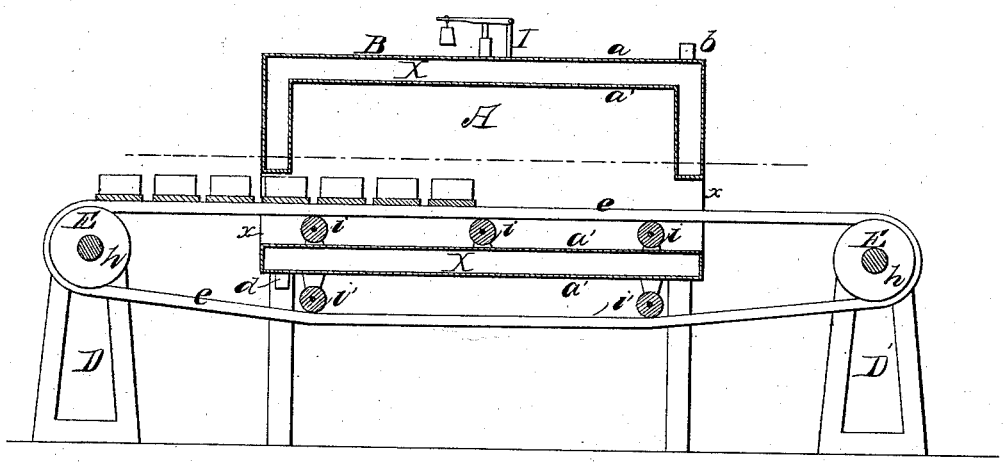
Figure 2:
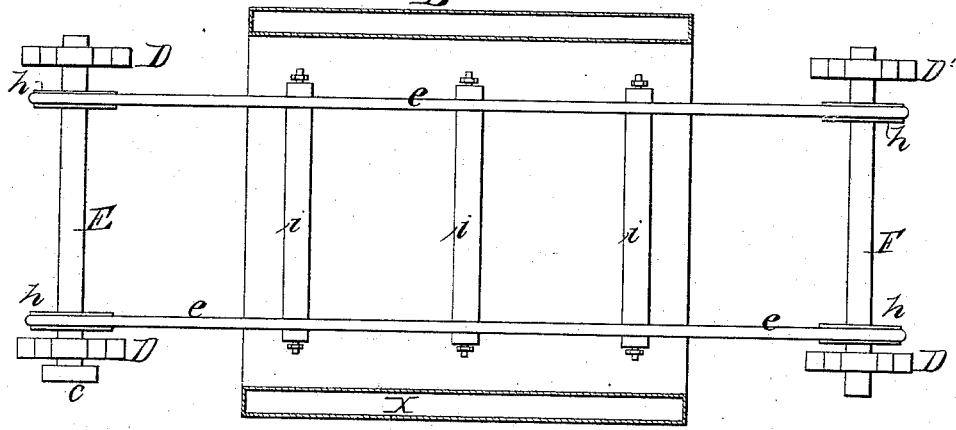

Figure 1 is a sectional elevation of my improved apparatus for drying bricks, tiles, etc.; and Figure 2 is a sectional plan on the line 1–2, fig. 1.

A is an oven which, in the present instance, consists of a double metal casing, the outer and inner shells $a\ a'$ of this casing enclosing a chamber, X, to which steam is admitted through a pipe, $b$. In each end of the oven is an opening, $x$; at the top is a safety-valve, I; and from the lower side projects a waste-water pipe, $d$, in which is a suitable cock. In standards D D D' D', near the opposite ends of the oven, turn shafts E F, and to one end of the shaft E is secured a pulley, $c$, which receives a band from a pulley on an adjacent driving-shaft. To each of the shafts E F are secured grooved pulleys $h\ h$, round which pass endless bands, $e\ e$, the latter extending through and beneath the oven, as shown in fig. 1. In brackets secured within the oven to the lower side of the casing $a'$ turn the journals of rollers $i\ i$, on which bear the chains $e\ e$, and in brackets secured to the lower side of the outer casing $a$ turn the journals of rollers $i'\ i'$, against which the chains $e\ e$ also bear. A rotary motion in the direction of its arrow is imparted to the shaft E, and off-bearings boards, $y$, (as fast as they receive bricks or other articles from the moulds in which they are formed,) are placed on the chains $e\ e$ above or near to the shaft E, the said boards and their contents being carried by the movement of the chains through the opening $x$ into the oven and toward the shaft F. The oven is of such a length, and is maintained at such a temperature, and the belts $e\ e$ move at such a speed, that the bricks or other articles, by the time they pass from the oven, will be dried sufficient to allow of their being removed from the boards and packed in the kiln. When the oven is heated by steam-casings, as above described, its temperature may be suddenly raised or lowered, or it may be maintained uniformly at any required degree of heat, a result which could not be effected were the oven heated directly by fires, the waste of time and fuel from over-baking the articles, or the possibility of withdrawing them before being sufficiently baked, being also prevented. As the bricks, from the time they leave the mould until they are packed in the kiln, receive but one handling, their form is better preserved, they are less liable to be broken or indented at the edges, and less time and labor is required, than when the ordinary process of transferring them while in a plastic state from the board to the drying-floor, and then from the latter to the kiln, is practised. Tiles, drain pipes, and other articles of clay may be dried before being burned by means of the above-described apparatus. The oven A may be constructed of brick, stone, or in any other suitable manner, and may be heated by steam-casings placed at the top and bottom of the same, or at the sides only, or by coils of pipe to which steam is admitted. An intermittent instead of a uniform motion may also be imparted to the chains $e\ e$, and the rollers $i'\ i'$ may be adjustable so as to take up any slack in the chains which may be caused by the stretching of the same.

Without confining myself to the precise construction and arrangement of parts herein described, I claim as my invention, and desire to secure by Letters Patent—

An oven A, having openings at both ends, and containing or surrounded by one or more steam-casings or steam pipes, in combination with endless bands or chains $e\ e$, which extend through the oven, and to which either a uniform or an intermittent motion is imparted, all substantially as and for the purpose described.

In testimony whereof I have signed my name to this specification in the presence of two subscribing witnesses.

ISAAC GREGG.

Witnesses:
CHAS. E. FOSTER,
W. J. R. DELANY.